(12) United States Patent
McCaffrey et al.

(10) Patent No.: US 10,047,629 B2
(45) Date of Patent: Aug. 14, 2018

(54) MULTI-SEGMENT ADJUSTABLE STATOR VANE FOR A VARIABLE AREA VANE ARRANGEMENT

(71) Applicant: United Technologies Corporation, Hartford, CT (US)

(72) Inventors: Michael G. McCaffrey, Windsor, CT (US); Tracy A. Propheter-Hinckley, Manchester, CT (US); Raymond Surace, Newington, CT (US); Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 460 days.

(21) Appl. No.: 14/763,719

(22) PCT Filed: Jan. 28, 2013

(86) PCT No.: PCT/US2013/023440
§ 371 (c)(1),
(2) Date: Jul. 27, 2015

(87) PCT Pub. No.: WO2014/116259
PCT Pub. Date: Jul. 31, 2014

(65) Prior Publication Data
US 2015/0369079 A1  Dec. 24, 2015

(51) Int. Cl.
*F01D 17/16* (2006.01)
*F01D 9/04* (2006.01)
(Continued)

(52) U.S. Cl.
CPC .............. *F01D 17/16* (2013.01); *F01D 9/04* (2013.01); *F01D 17/162* (2013.01); *F02C 9/22* (2013.01);
(Continued)

(58) Field of Classification Search
CPC .......... F01D 17/16; F01D 17/162; F01D 9/04; F01D 9/22; F01D 9/065; F01D 5/147; F05D 2260/201; F05D 2260/202
(Continued)

(56) References Cited

U.S. PATENT DOCUMENTS 3,558,237 A  1/1971  Wall et al.
4,498,291 A  2/1985  Jeffery
(Continued)

OTHER PUBLICATIONS

EP search report for EP13871926.5 dated Feb. 4, 2016.
EP search report for EP13872458.8 dated Apr. 28, 2016.

*Primary Examiner* — Patrick Maines
*Assistant Examiner* — Dapinder Singh
(74) *Attorney, Agent, or Firm* — O'Shea Getz P.C.

(57) ABSTRACT

An assembly for a turbine engine includes a plurality of vane segments. The vane segments are fastened together and form an adjustable stator vane that pivots about a variable vane axis. The adjustable stator vane includes a stator vane body, a shaft and a flange. The stator vane body extends axially between a first end and a second end, and includes an airfoil, a body surface and a cavity. The body surface is located at the first end. The cavity extends axially from an inlet in the body surface and into the airfoil. The shaft extends along the variable vane axis from the first end. The flange extends circumferentially at least partially around the inlet, and radially from the stator vane body. A first of the vane segments includes the flange. A second of the vane segments includes at least a portion of the airfoil.

17 Claims, 10 Drawing Sheets

(51) Int. Cl.
*F02C 9/22* (2006.01)
*F01D 5/14* (2006.01)
*F01D 9/06* (2006.01)

(52) U.S. Cl.
CPC .............. *F01D 5/147* (2013.01); *F01D 9/065* (2013.01); *F05D 2260/201* (2013.01); *F05D 2260/202* (2013.01)

(58) Field of Classification Search
USPC ........................................................ 415/160
See application file for complete search history.

(56) References Cited

U.S. PATENT DOCUMENTS

| | | | |
|---|---|---|---|
| 4,883,404 A | 11/1989 | Sherman | |
| 5,931,636 A | 8/1999 | Savage et al. | |
| 6,193,465 B1 | 2/2001 | Liotta et al. | |
| 7,264,441 B2* | 9/2007 | Loudet | F01D 17/162 415/144 |
| 9,103,222 B2* | 8/2015 | Propheter-Hinckley | F01D 11/001 |
| 9,273,565 B2* | 3/2016 | Propheter-Hinckley | F01D 17/162 |
| 9,279,335 B2* | 3/2016 | Propheter-Hinckley | F01D 9/041 |
| 9,500,122 B2* | 11/2016 | Clancy | F02B 37/24 |
| 2003/0106215 A1 | 6/2003 | Heyward et al. | |
| 2005/0201856 A1 | 9/2005 | Koshoffer | |
| 2008/0031730 A1 | 2/2008 | Houradou et al. | |
| 2009/0097966 A1 | 4/2009 | McCaffrey | |
| 2010/0202873 A1* | 8/2010 | Andrew | F01D 5/187 415/116 |
| 2010/0247293 A1 | 9/2010 | McCaffrey et al. | |
| 2011/0081248 A1 | 4/2011 | Hibbard | |
| 2012/0213634 A1 | 8/2012 | Samulesson | |

* cited by examiner

MULTI-SEGMENT ADJUSTABLE STATOR VANE FOR A VARIABLE AREA VANE ARRANGEMENT

This invention was made with government support under Contract No. N00014-09-D-0821 awarded by the United States Navy. The government may have certain rights in the invention.

This application claims priority to PCT Patent Application No. PCT/US13/23440 filed Jan. 28, 2013, which is hereby incorporated by reference.

BACKGROUND OF THE INVENTION

1. Technical Field

This disclosure relates generally to a turbine engine and, more particularly, to a variable area vane arrangement for a turbine engine.

2. Background Information

A typical turbine engine includes a fan section, a compressor section, a combustor section and a turbine section. The turbine engine may also include a plurality of variable area vane arrangements. Each variable area vane arrangement may guide and/or adjust a flow of core gas in one or more turbine stages. Alternatively, the variable area vane arrangement may guide and/or adjust the flow of core gas between an upstream engine section and an adjacent downstream engine section.

A typical variable area vane arrangement includes a plurality of adjustable stator vanes that extend between a radial outer vane platform and a radial inner vane platform. An outer radial end of each stator vane is rotatably connected to the outer vane platform with an outer shaft and a bearing. An inner radial end of each stator vane is rotatably connected to the inner vane platform with an inner shaft and a bearing. The outer shaft may include a bore that directs cooling air from a plenum, adjacent the outer vane platform, into a cavity within an airfoil of the respective stator vane. Airfoil cooling apertures may subsequently direct the cooling air out of the cavity to film cool the outer surfaces of the airfoil that are exposed to the core gas. To provide a sufficient quantity of the cooling air, the outer shaft bore typically has a relatively large diameter. As the diameter of the outer shaft bore increases, however, the size of the bearing also increases, which may increase the weight, cost and complexity of the vane arrangement.

There is a need in the art for an improved variable area vane arrangement.

SUMMARY OF THE DISCLOSURE

According to an aspect of the invention, an assembly is provided for a turbine engine. The assembly includes a plurality of vane segments that are fastened together to form an adjustable stator vane that pivots about a variable vane axis. The adjustable stator vane includes a stator vane body, a shaft and a flange. The stator vane body extends axially between a first end and a second end, and includes an airfoil, a body surface and a cavity. The body surface is located at the first end. The cavity extends axially from an inlet in the body surface and into the airfoil. The shaft extends along the variable vane axis from the first end. The flange extends circumferentially at least partially around the inlet, and radially from the stator vane body. A first of the vane segments includes the flange. A second of the vane segments includes at least a portion of the airfoil.

According to another aspect of the invention, another assembly is provided for a turbine engine. The assembly includes a plurality of vane segments that are fastened together and form an adjustable stator vane that pivots about a variable vane axis. The adjustable stator vane includes a stator vane body, a shaft and a flange. The stator vane body extends axially between a first end and a second end, and includes an airfoil with an airfoil surface. The shaft is connected to the stator vane body at the first end, and extends along the variable vane axis. The flange is connected to the stator vane body at the first end. The flange extends circumferentially at least partially around the shaft, and radially from the stator vane body. The flange is axially separated from the airfoil surface by a gap. A first of the vane segments includes the flange. A second of the vane segments includes at least a portion of the airfoil.

The first end may be a vane outer end and the second end may be a vane inner end. Alternatively, the first end may be a vane inner end and the second end may be a vane outer end.

The stator vane body may include a body surface and a cavity. The body surface may be located at the first end. The cavity may extend axially from an inlet in the body surface and into the airfoil. The flange may extend circumferentially partially or completely around the inlet.

The flange may extend circumferentially around the inlet. The flange may also extend circumferentially around the shaft.

The assembly may include a seal that extends circumferentially, partially around the shaft, between a seal first end and a seal second end. The flange may extend circumferentially, partially around the inlet and/or the shaft, between a flange first end and a flange second end. The seal first end may engage the flange first end. The seal second end may engage the flange second end.

The first of the vane segments may include a portion of the airfoil.

The stator vane body may include a neck that extends axially between the body surface and the airfoil. The flange may extend circumferentially around and radially from the neck. The flange may be axially separated from a surface of the airfoil by a gap.

The first of the vane segments may include the neck. Alternatively, the first of the vane segments may include a first portion of the neck. The second of the vane segments may include a second portion of the neck.

The assembly may include a lip that extends circumferentially at least partially around the inlet and the shaft, and axially from a surface of the flange towards the second end. A channel may extend radially between the stator vane body and the lip.

One or more cooling apertures may extend axially through the flange to the channel.

The airfoil may extend longitudinally between a leading edge and a trailing edge. The airfoil may also or alternatively extend laterally between a concave surface and a convex surface. The airfoil may include one or more cooling apertures that extend from the cavity to the leading edge. The airfoil may also or alternatively include one or more cooling apertures that extend from the cavity to the trailing edge. The airfoil may also or alternatively include one or more cooling apertures that extend from the cavity to the concave surface. The airfoil may also or alternatively include one or more cooling apertures that extend from the cavity to the convex surface.

The first of the vane segments may engage the second of the vane segments at a joint. The joint may be configured as or otherwise include a butt joint, a lap joint, a scarf joint and/or any other type of joint.

The first of the vane segments may be welded, brazed, adhered and/or otherwise bonded to the second of the vane segments. The first of the vane segments may also or alternatively be mechanically fastened to the second of the vane segments with one or more fasteners.

The assembly may include a vane first platform with a vane aperture, and a vane second platform. The shaft may be configured as or otherwise include a first shaft that is rotatably connected to the first platform. The adjustable stator vane may include a second shaft that extends along the variable vane axis from the second end, and is rotatably connected to the second platform. The adjustable stator vane may extend axially from the second end at least partially into the vane aperture and to the first end. The airfoil may be arranged between first platform and the second platform.

The assembly may include a fixed stator vane connected to the first platform and the second platform. The first platform may be arranged within the second platform. Alternatively, the second platform may be arranged within the first platform.

The foregoing features and the operation of the invention will become more apparent in light of the following description and the accompanying drawings.

DETAILED DESCRIPTION OF THE INVENTION

Figure 1:
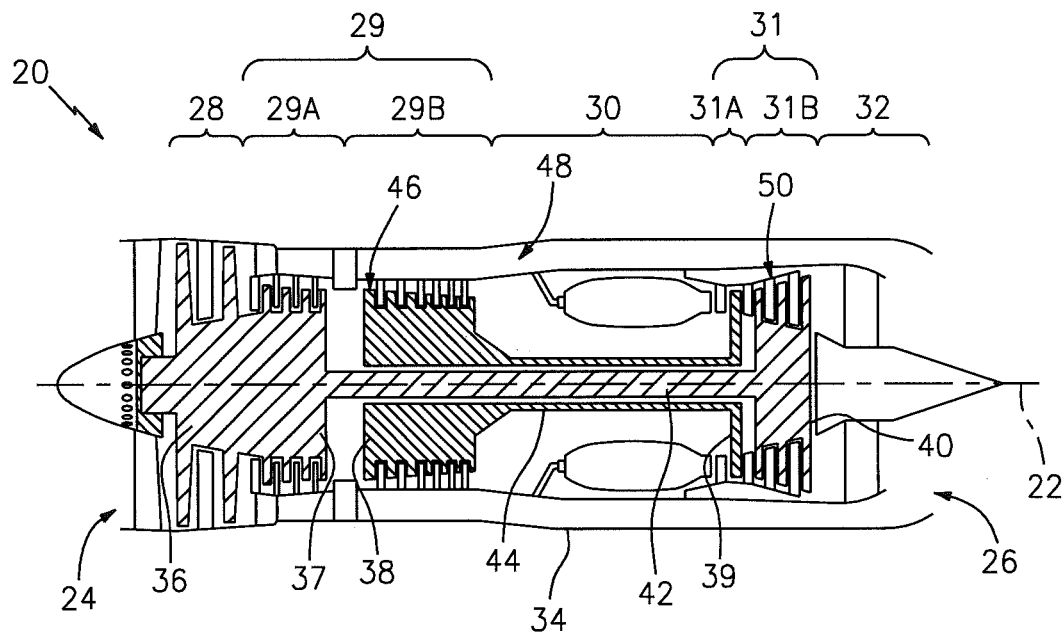
FIG. 1 is a side sectional illustration of a turbine engine.

FIG. 1 is a side sectional illustration of a turbine engine 20 that extends along an engine axis 22 between an upstream airflow inlet 24 and a downstream airflow exhaust 26. The engine 20 includes a fan section 28, a compressor section 29, a combustor section 30, a turbine section 31 and a nozzle section 32. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-32 are arranged sequentially along the axis 22 within an engine case 34.

Each of the engine sections 28, 29A, 29B, 31A and 31B includes a respective rotor 36-40. Each of the rotors 36-40 includes a plurality of rotor blades arranged circumferentially around and connected to (e.g., formed integral with or mechanically fastened, welded, brazed or otherwise adhered to) one or more respective rotor disks. The fan rotor 36 and the LPC rotor 37 are connected to and driven by the LPT rotor 40 through a low speed shaft 42. The HPC rotor 38 is connected to and driven by the HPT rotor 39 through a high speed shaft 44.

Air enters the engine 20 through the airflow inlet 24, and is directed through the fan section 28 and into an annular core gas path 46 and an annular bypass gas path 48. The air within the core gas path 46 may be referred to as "core air". The air within the bypass gas path 48 may be referred to as "bypass air". The core air is directed through the engine sections 29-32 and exits the engine 20 through the airflow exhaust 26. Within the combustor section 30, fuel is injected into and mixed with the core air and ignited to provide forward engine thrust. The bypass air is directed through the bypass gas path 48 and is utilized to provide additional forward engine thrust.

The engine 20 also includes at least one variable area vane arrangement 50 that directs the flow of core air for the turbine section 31. The variable area vane arrangement 50, for example, guides and/or adjusts the flow of the core air between adjacent rotor stages of the LPT section 31B.

Figure 2:
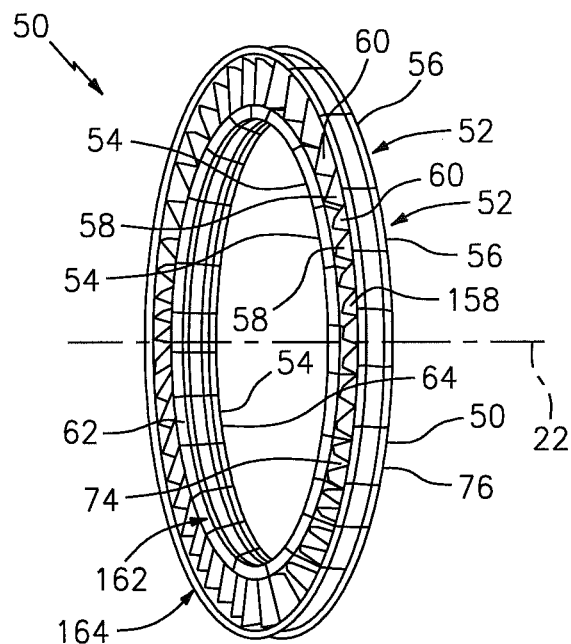
FIG. 2 is a perspective illustration of a variable area vane arrangement for the engine of FIG. 1.
Figure 3:
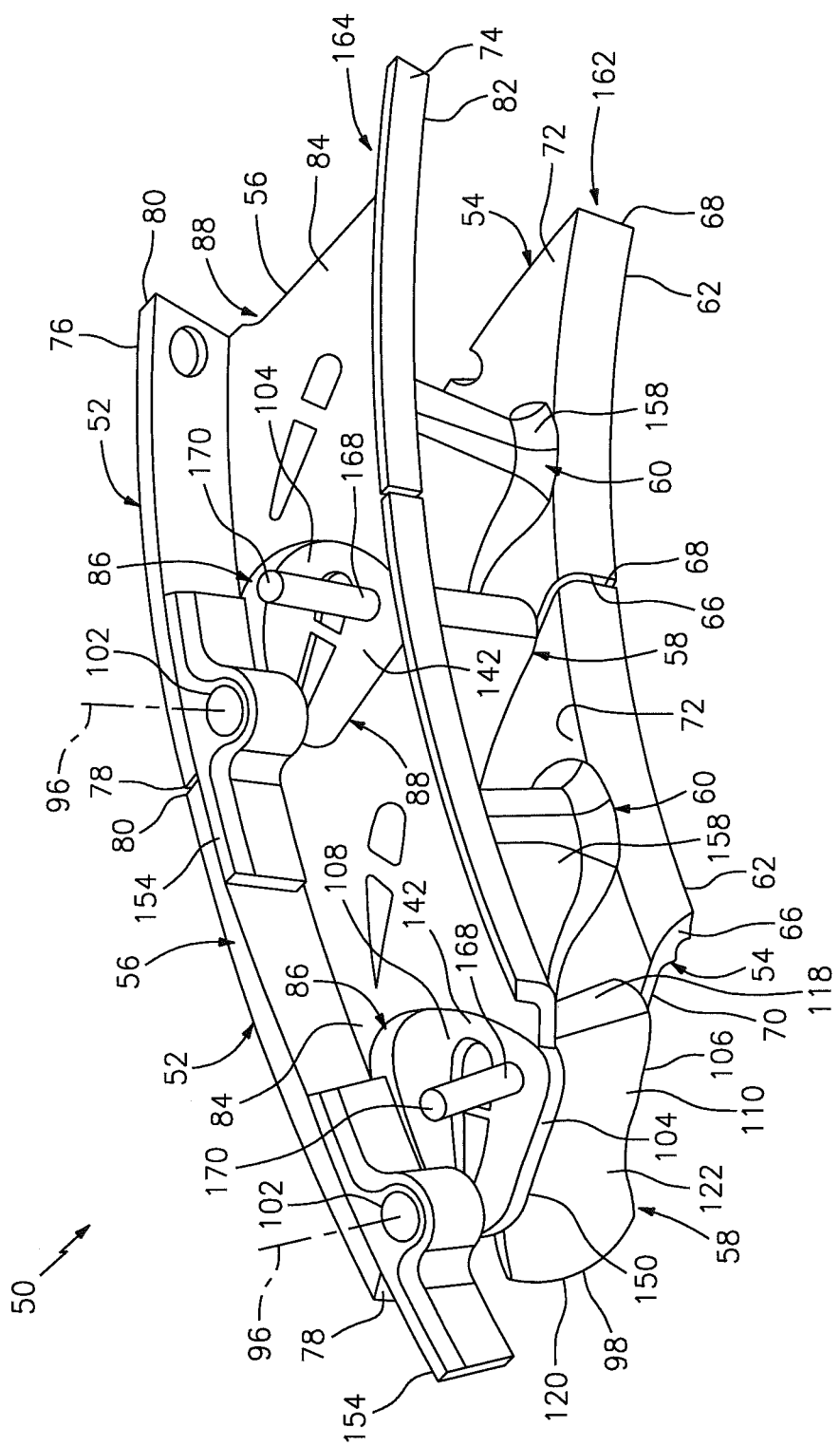
FIG. 3 is a perspective illustration of a portion of the variable area vane arrangement of FIG. 2.

FIG. 2 is a perspective illustration of the variable area vane arrangement 50 of FIG. 1. FIG. 3 is a perspective illustration of a portion of the variable area vane arrangement 50 of FIG. 2. The variable area vane arrangement 50 includes a plurality of vane arrangement segments 52. One or more of the vane arrangement segments 52 each includes a vane inner platform 54, a vane outer platform 56, and at least one multi-segment adjustable stator vane 58 (e.g., a hollow adjustable stator vane). One or more of the vane arrangement segments 52 each further includes at least one fixed stator vane 60 (e.g., a hollow fixed stator vane).

The inner platform 54 extends axially relative to the axis 22 between an upstream platform end 62 and a downstream platform end 64. Referring to FIG. 3, the inner platform 54 extends circumferentially relative to the axis 22 between a first platform end 66 and a second platform end 68. The inner platform 54 extends radially relative to the axis 22 between an inner platform surface 70 and an outer platform surface 72. The outer platform surface 72 forms a portion of an inner surface of the core gas path 46 (see FIG. 1).

The outer platform 56 extends axially relative to the axis 22 between an upstream platform end 74 and a downstream platform end 76. The outer platform 56 extends circumferentially relative to the axis 22 between a first platform end 78 and a second platform end 80. The outer platform 56 extends radially relative to the axis 22 between an inner platform surface 82 and an outer platform surface 84. The inner platform surface 82 forms a portion of an outer surface of the core gas path 46 (see FIG. 1).

Figure 4:
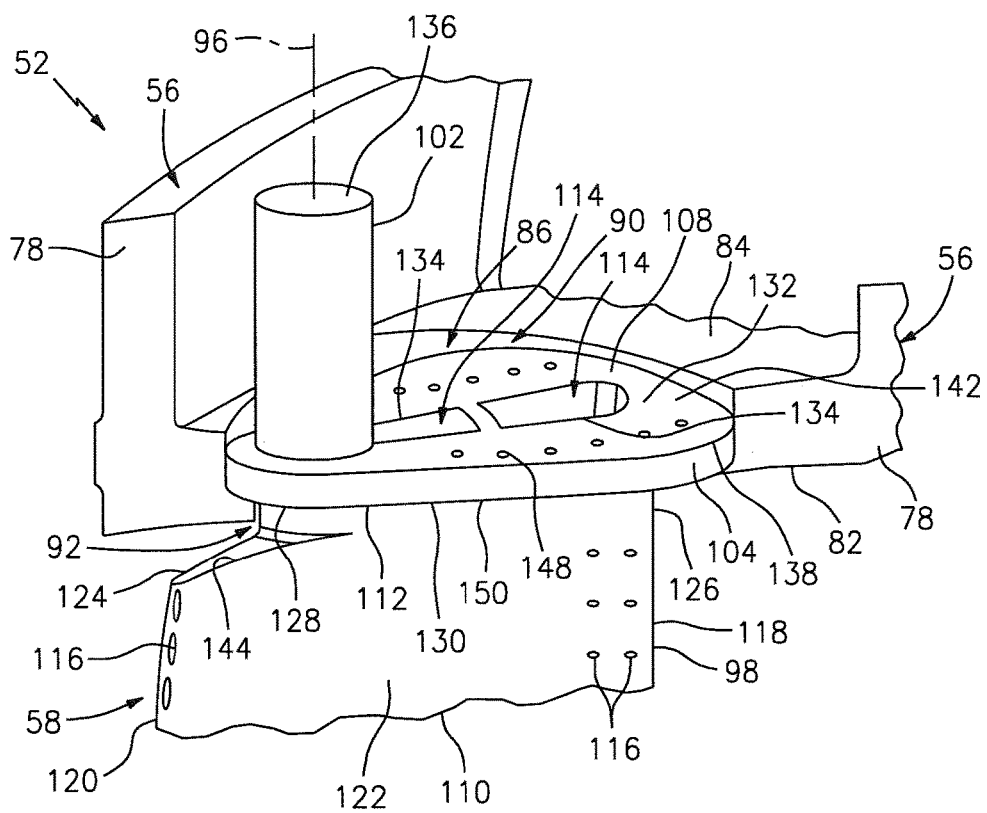
FIG. 4 is a perspective illustration of a portion of the variable area vane arrangement of FIG. 3.
Figure 5:
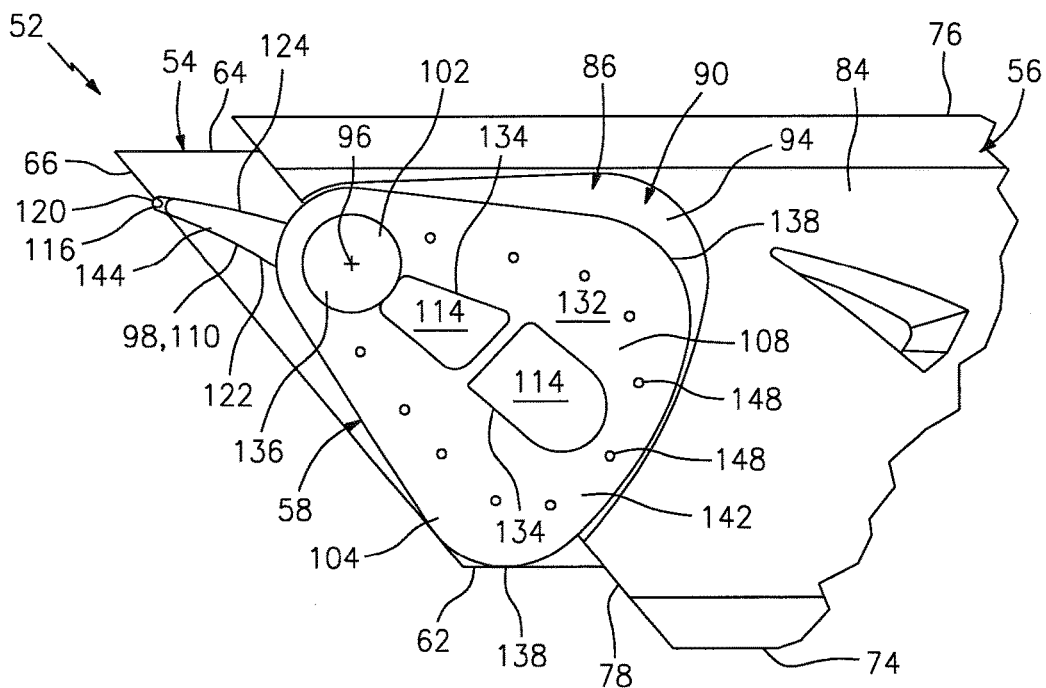
FIG. 5 is a top view illustration of a portion of the variable area vane arrangement of FIG. 3.
Figure 6:
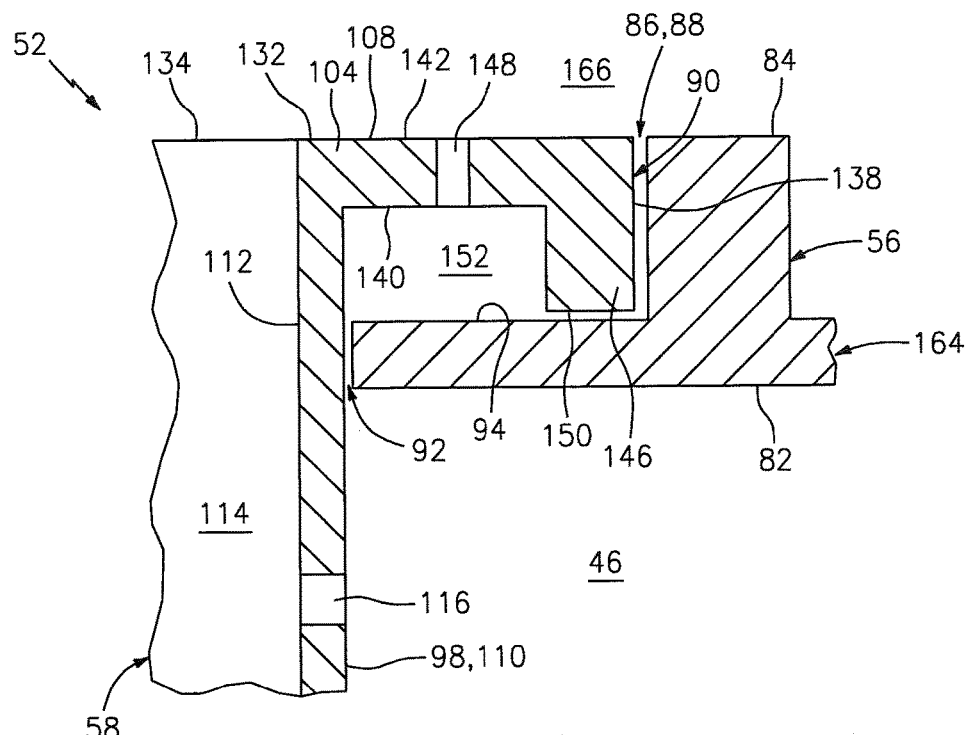
FIG. 6 is a side sectional illustration of a portion of the variable area vane arrangement of FIG. 3.

The outer platform 56 includes one or more vane apertures such as, for example, a first vane aperture 86 and a second vane aperture 88. The first vane aperture 86 is located at (e.g., on, adjacent or proximate) the first platform end 78. The second vane aperture 88 is located at the second platform end 80. One or more of the vane apertures 86 and 88 each extends radially relative to the axis 22 through the outer platform 56 between the inner platform surface 82 and the outer platform surface 84. Referring to FIGS. 4 to 6, one or more of the vane apertures 86 and 88 each includes an aperture first portion 90, an aperture second portion 92, and an aperture shelf 94. The first portion 90 extends radially from the outer platform surface 84 to the second portion 92. The second portion 92 extends radially from the inner platform surface 82 to the first portion 90. The aperture shelf 94 is defined at the intersection between the first portion 90 and the second portion 92. The aperture shelf 94 may be configured as a substantially flat, parti-annular platform surface.

Referring to FIG. 3, the adjustable stator vane 58 is adapted to pivot about a variable vane axis 96, which may extend radially relative to the axis 22. The adjustable stator vane 58 includes a stator vane body 98, one or more shafts 100 and 102 (see also FIG. 8), and a flange 104.

Figure 7:
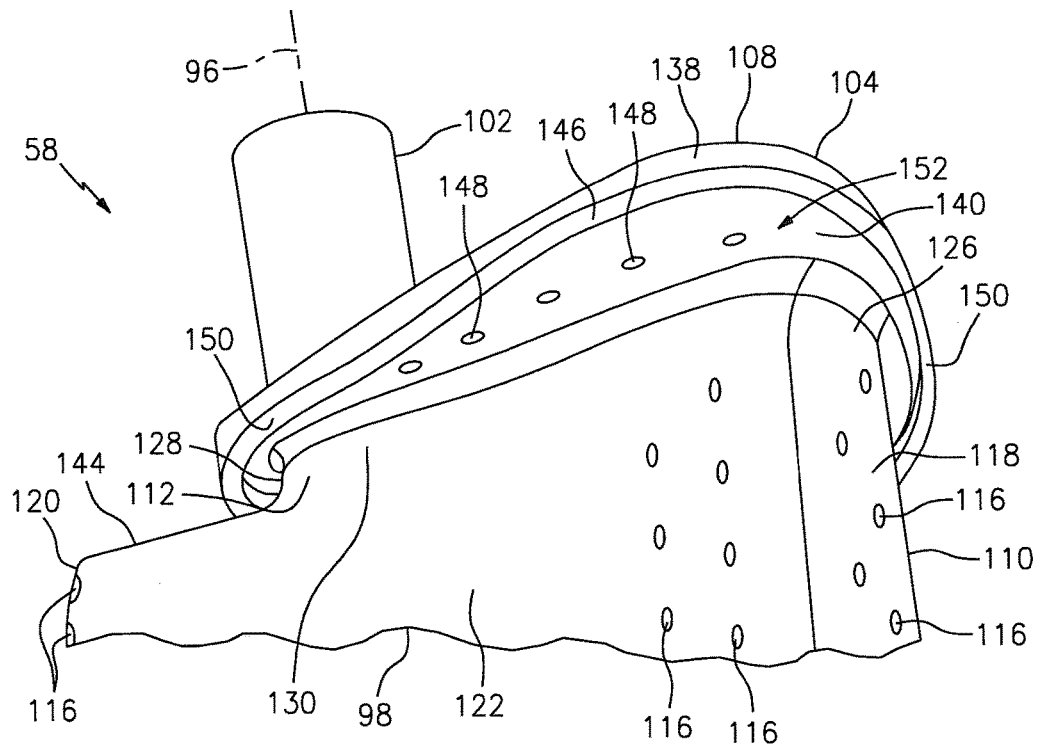
FIG. 7 is a perspective illustration of a portion of an adjustable stator vane for the variable area vane arrangement of FIG. 3.

The stator vane body 98 extends axially relative to the axis 96 (e.g., radially relative to the axis 22) between a body inner end 106 and a body outer end 108. Referring to FIGS. 4, 5 and 7, the stator vane body 98 includes an airfoil 110, a neck 112, one or more cavities 114, and one or more cooling apertures 116. The airfoil 110 extends axially relative to the axis 96 from the inner end 106 (see FIG. 3) to the neck 112. The airfoil 110 extends longitudinally between an airfoil leading edge 118 and an airfoil trailing edge 120. The airfoil 110 extends laterally between an airfoil concave surface 122 and an airfoil convex surface 124.

The neck 112 extends axially relative to the axis 96 from the airfoil 110 to the outer end 108. The neck 112 extends longitudinally between a neck leading edge 126 (e.g., the airfoil leading edge 118) and a neck trailing edge 128. The neck 112 extends laterally between a neck first surface 130 (e.g., a portion of the airfoil concave surface 122) and a neck second surface (e.g., a portion of the airfoil convex surface 124). The neck 112 includes a body surface 132 that is located at the outer end 108.

Referring to FIG. 6, one or more of the cavities 114 each extends axially relative to the axis 96 into (or through) the stator vane body 98 from a respective cavity inlet 134 in the body surface 132. One or more of the cavities 114, for example, each extends axially from the respective cavity inlet 134, through the neck 112, and into the airfoil 110.

Referring to FIGS. 4 to 7, one or more of the cooling apertures 116 each extends through the stator vane body 98 from a respective one of the cavities 114 to the airfoil leading edge 118. One or more of the cooling apertures 116 each extends through the stator vane body 98 from a respective one of the cavities 114 to the airfoil trailing edge 120. One or more of the cooling apertures 116 each extends through the stator vane body 98 from a respective one of the cavities 114 to the airfoil concave surface 122. One or more of the cooling apertures 116 each extends through the stator vane body 98 from a respective one of the cavities 114 to the airfoil convex surface 124.

Figure 8:
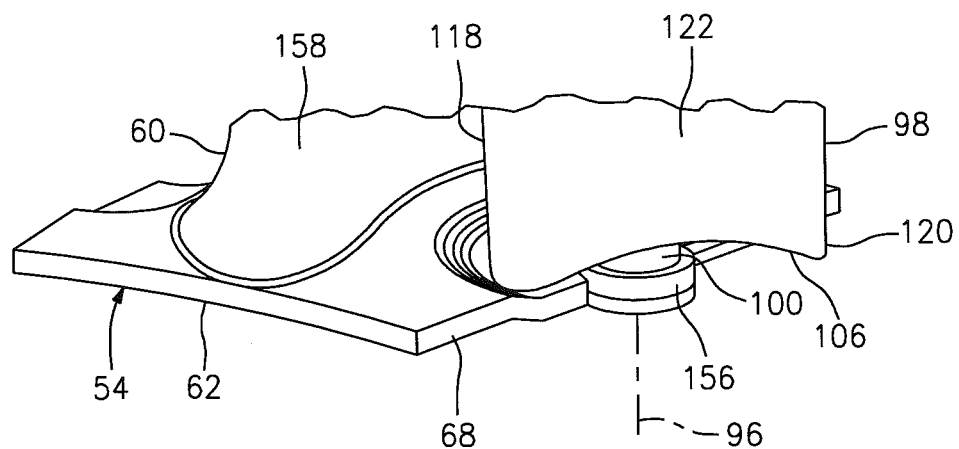
FIG. 8 is another perspective illustration of a portion of the variable area vane arrangement of FIG. 3.

Referring to FIG. 8, the inner shaft 100 (e.g., a solid shaft) is connected to the stator vane body 98 at the body inner end 106. The inner shaft 100 extends along the axis 96 from the body inner end 106. The inner shaft 100 is located a first distance from the airfoil leading edge 118. The inner shaft 100 is located a second distance from the airfoil trailing edge 120 that may be different (e.g., less) than the first distance.

Referring to FIGS. 4 and 5, the outer shaft 102 (e.g., a solid shaft) is connected to the stator vane body 98 at the body outer end 108. The outer shaft 102 extends along the axis 96 from the body surface 132 to a distal shaft end 136. The outer shaft 102 is located a first distance from the airfoil leading edge 118. The outer shaft 102 is located a second distance from the airfoil trailing edge 120 that may be different (e.g., less) than the first distance.

Referring to FIGS. 4, 5 and 7, the flange 104 is connected to the stator vane body 98 at the body outer end 108. The flange 104 extends circumferentially around one or more of the cavity inlets 134 and/or the outer shaft 102. The flange 104 extends radially relative to the axis 96 out from the stator vane body 98. The flange 104 extends radially out from, for example, the neck leading edge 126, the neck trailing edge 128, the neck first surface 130 and/or the neck second surface (e.g., a portion of the airfoil convex surface 124) to a distal flange end 138. The flange 104 extends axially relative to the axis 96 between an inner flange surface 140 and an outer flange surface 142 (e.g., the body surface 132). The inner flange surface 140 is axially separated from a surface 144 of the airfoil 110 by a gap.

Referring to FIGS. 6 and 7, the flange 104 includes a flange lip 146 and one or more cooling apertures 148. The flange lip 146 extends circumferentially substantially (or partially) around one or more of the inlets 134 and/or the outer shaft 102. The flange lip 146, for example, is located at and extends circumferentially along the distal flange end 138. The flange lip 146 extends axially relative to the axis 96 from the inner flange surface 140 towards the body inner end 106 (see FIG. 3) and to a vane surface 150. The vane surface 150 is axially separated from the airfoil surface 144 by a gap.

Referring to FIGS. 5 to 7, one or more of the cooling apertures 148 extend axially through the flange 104 between the inner flange surface 140 and the outer flange surface 142. One or more of the cooling apertures 148 are located proximate the airfoil leading edge 118. One or more of the cooling apertures 148 are located proximate the airfoil concave surface 122. One or more of the cooling apertures 148 are located proximate the airfoil convex surface 124.

Referring to FIGS. 4 to 6, the adjustable stator vane 58 is mated with the first vane aperture 86. The flange 104 is seated in the aperture first portion 90 and the vane surface 150 forms a seal with the aperture shelf 94. Referring to FIGS. 6 and 7, a cooling channel 152 extends circumferentially around the stator vane body 98 (e.g., the neck 112). The cooling channel 152 extends radially relative to the axis 96 between the stator vane body 98 (e.g., the neck 112) and the flange lip 146. The cooling channel 152 extends axially between the aperture shelf 94 and the inner flange surface 140.

Referring to FIG. 3, the inner platform 54 is arranged radially relative to the axis 22 within the outer platform 56. The airfoil 110 is arranged between and rotatably connected to the inner platform 54 and the outer platform 56. The outer shaft 102 is rotatably connected to the outer platform 56 with a bearing 154 such as, for example, a pillow block bearing or any other type of bearing or bushing. Referring to FIG. 8, the inner shaft 100 is rotatably connected to the inner platform 54 with a bearing 156 such as, for example, a cartridge bearing or any other type of bearing or bushing.

Referring to FIGS. 2 and 3, the fixed stator vane 60 includes an airfoil 158 that is arranged and extends between the inner platform 54 and the outer platform 56. The airfoil 158 is fixedly connected to (e.g., integral with) the inner platform 54 and/or the outer platform 56.

Referring to FIG. 6, each of the adjustable stator vanes 58 is mated with the second vane aperture 88. The flange 104 is seated in the aperture first portion 90 and the vane surface 150 engages the aperture shelf 94. The cooling channel 152 extends axially between the aperture shelf 94 and the inner flange surface 140.

Referring to FIGS. 2 and 3, each of the vane arrangement segments 52 is mechanically fastened, welded, brazed, adhered and/or otherwise bonded between respective adjacent vane arrangement segments 52 (or to adjacent supporting static hardware) to form the variable area vane arrangement 50. For example, each first platform end 66 is arranged adjacent to a respective second platform end 68 and each inner platform 54 is fastened to another inner platform 54, thereby forming an annular stator vane inner platform 162. Each first platform end 78 is arranged adjacent to a respective second platform end 80 and each outer platform 56 is fastened to another outer platform 56, thereby forming an annular stator vane outer platform 164.

During engine operation, one or more of the adjustable stator vanes 58 are each pivoted about its axis 96 to guide the flow of core gas through the variable area vane arrangement 50 according to a trajectory. One or more of the adjustable stator vanes 58 may also or alternatively each be pivoted about its axis 96 to adjust (e.g., increase or decrease) the flow of core gas through the variable area vane arrangement 50. Referring to FIG. 6, the vane surface 150 may respectively maintain the seal with the platform surfaces (e.g., the aperture shelves 94) during the pivoting of the respective adjustable stator vane 58. The flange 104 and the flange lip 146 therefore may reduce and/or eliminate gas leakage through the gap between the adjustable stator vane 58 and the annular stator vane outer platform 164 during the pivoting of the respective adjustable stator vane 58.

Referring to FIGS. 5 to 7, the cavity inlets 134 respectively direct cooling air from a plenum 166 adjacent the outer platform surface 84 into the cavities 114. This cooling air may be a portion of the core air that is bled from the compressor section 29 (e.g., the HPC section 29B of FIG. 1) and directed into the plenum 166 through an internal passage (not shown). The cooling apertures 116 subsequently direct the cooling air out of the airfoil 110 to cool (e.g., film cool) the airfoil concave surface 122, the airfoil convex surface 124, the airfoil leading edge 118, and/or the airfoil trailing edge 120. Where the adjustable stator vane 58 is pivoted such that the gap between a wall of the aperture second portion 92 and the airfoil 110 is small (as shown in FIG. 6), one or more of the cooling apertures 148 may direct the cooling air from the plenum 166 into the cooling channel 152 to cool (e.g., impingement cool) the aperture shelve 94. The cooling air may subsequently leak through the gap to cool (e.g., film cool) the inner platform surface 82. As the adjustable stator vane 58 pivots in the opposite direction, the gap may become larger and a portion of the inner flange surface 140 and/or one or more of the cooling apertures 148 may become exposed to the core gas path 46. The cooling apertures 148 therefore may no longer provide impingement cooling to aperture shelf 94, but may rather provide film cooling for inner platform surface 82.

Referring to FIG. 3, one or more of the adjustable stator vanes 58 may each include a vane actuation element 168 connected to the respective flange 104. The actuation element 168 may be configured as a cylindrical shaft, and extend axially from the flange outer surface 142 to a distal actuation element end 170. The distal actuation element end 170 is adapted to connect to a vane actuator (not shown) such as, for example, a unison ring. Alternatively, the actuation element may be configured as a linkage arm connected to the distal end of the outer shaft. The present invention, of course, is not limited to any particular actuation element or vane actuator configurations.

Figure 9:
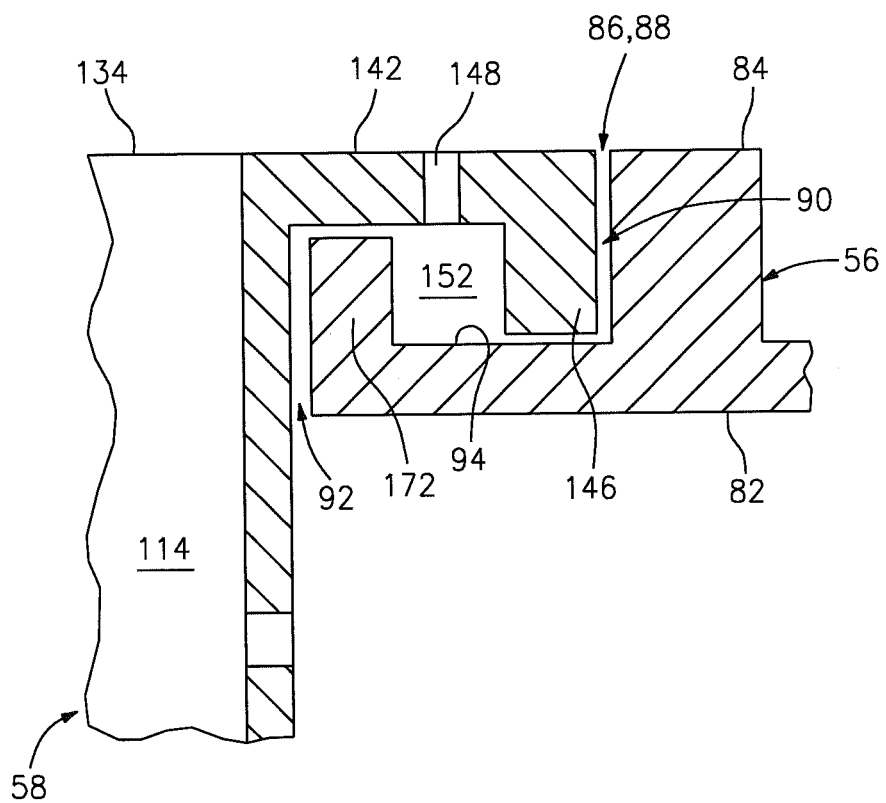
FIG. 9 is a side sectional illustration of a portion of another variable area vane arrangement for the engine of FIG. 1.

Referring to FIG. 9, in some embodiments, the outer platform 56 may include a platform lip 172 that extends substantially (or partially) along an edge of the first and/or the second vane apertures 86 and 88. The platform lip 172 extends axially relative to the axis 96 into the cooling channel 152 from the aperture shelf 94.

Figure 10:
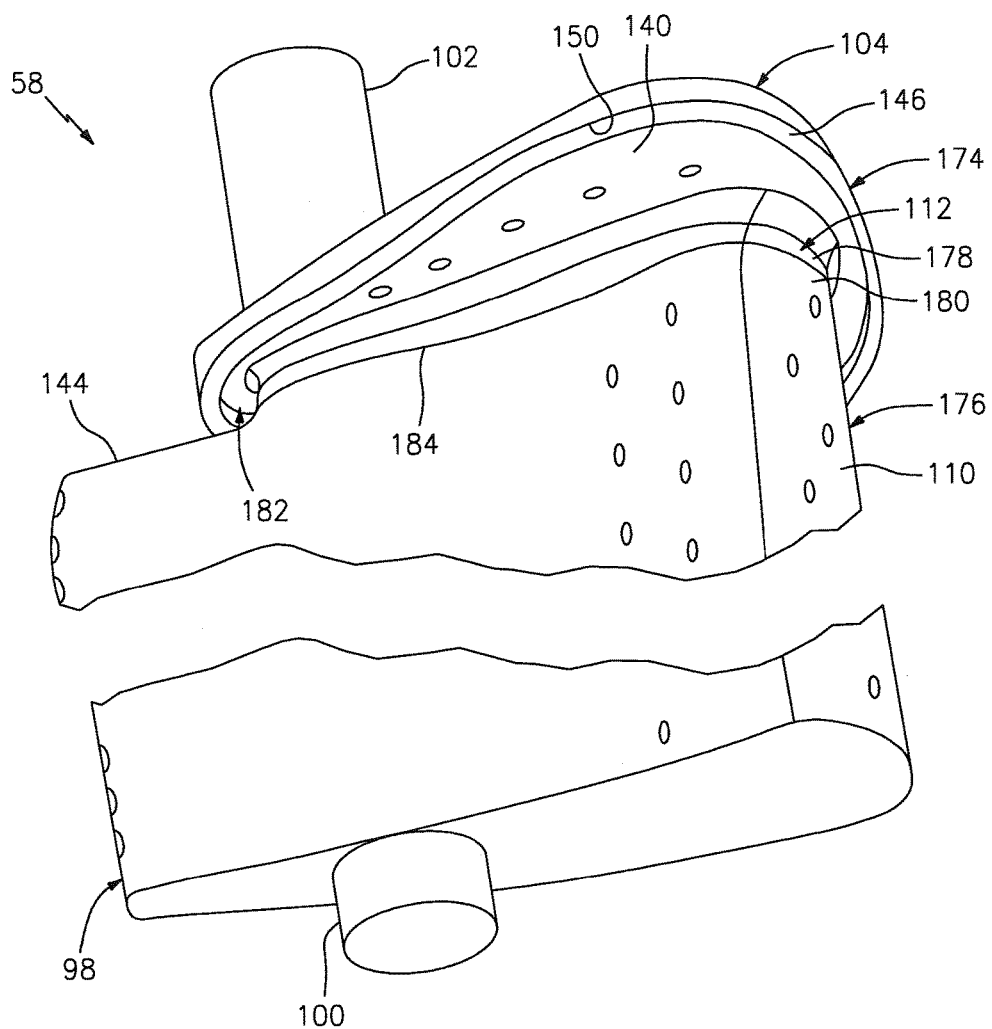
FIG. 10 is a perspective illustration of a portion of an adjustable stator vane for the variable area vane arrangement of FIG. 3.

Referring to FIG. 10, the adjustable stator vane 58 is formed from a plurality of discrete vane segments, which include a first vane segment 174 and a second vane segment 176. The first vane segment 174 includes the outer shaft 102, the flange 104 and a first portion 178 of the neck 112. The second vane segment 176 includes the airfoil 110, the inner shaft 100 and a second portion 180 of the neck 112. The first and/or the second vane segments 174 and 176 are each cast, machined, milled, forged and/or otherwise formed as a discrete unitary body. The first portion 178 of the neck 112, for example, is formed integral with the outer shaft 102 and the flange 104. The airfoil 110 is formed integral with the inner shaft 100 and the second portion 180 of the neck 112. The first vane segment 174 and the second vane segment 176 therefore may be formed from different types of materials (e.g., different metals and/or metal alloys). The first vane segment 174 and the second vane segment 176, of course, may alternatively be formed from the same type of material.

By forming the first and the second vane segments 174 and 176 as discrete bodies, a region 182 of the flange 104 that overlaps the airfoil surface 144 may be formed using standard formation techniques before the vane segments 174 and 176 are fastened together. In contrast, where the airfoil 110 is formed integral with the flange 104, the airfoil 110 may obstruct access to the region 182. This obstructed access may increase the difficulty and/or cost to form the inner flange surface 140 and/or the flange lip 146 in the region 182. The obstructed access may also or alternatively limit the complexity of the flange 104 design in the region 182.

Figure 11:
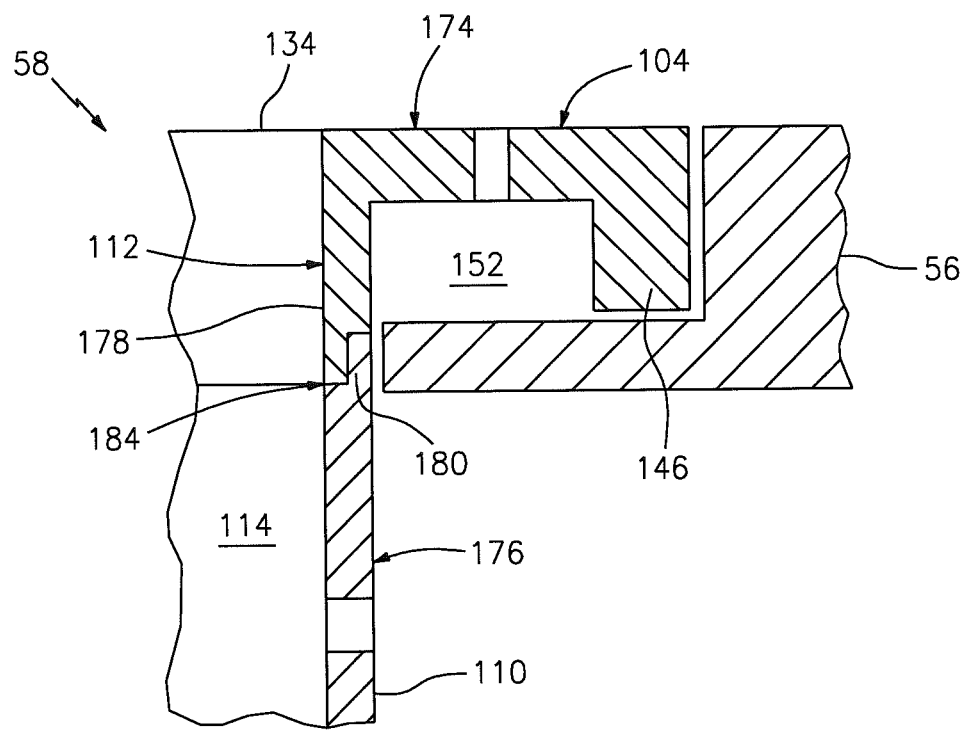
FIG. 11 is another side sectional illustration of a portion of the variable area vane arrangement of FIG. 3.
Figure 12:
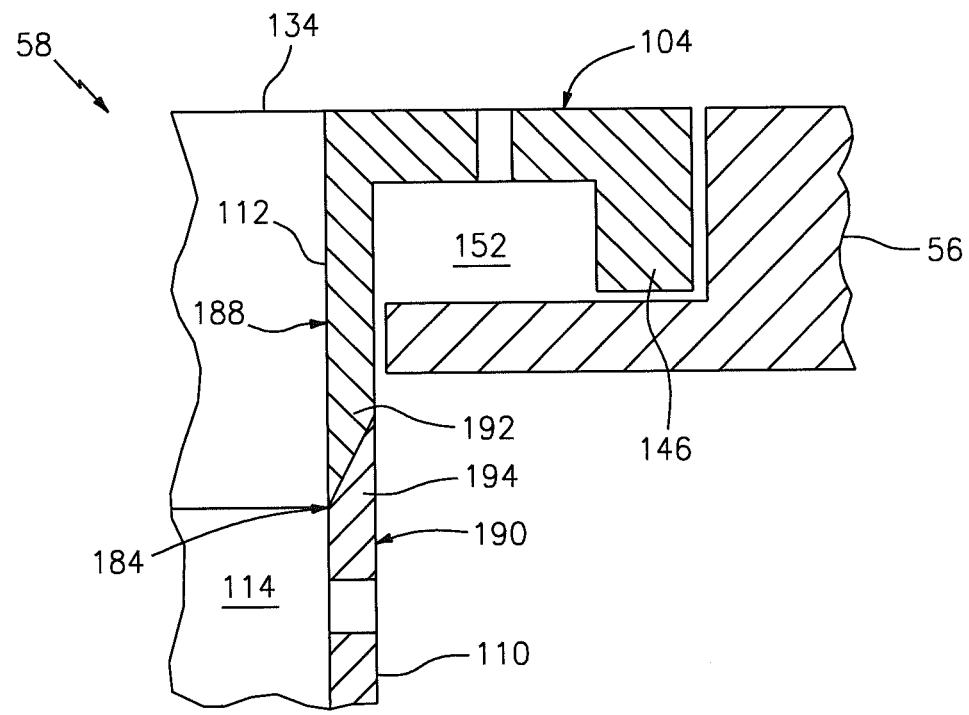
FIG. 12 is another side sectional illustration of a portion of the variable area vane arrangement of FIG. 3 with another adjustable stator vane.
Figure 13:
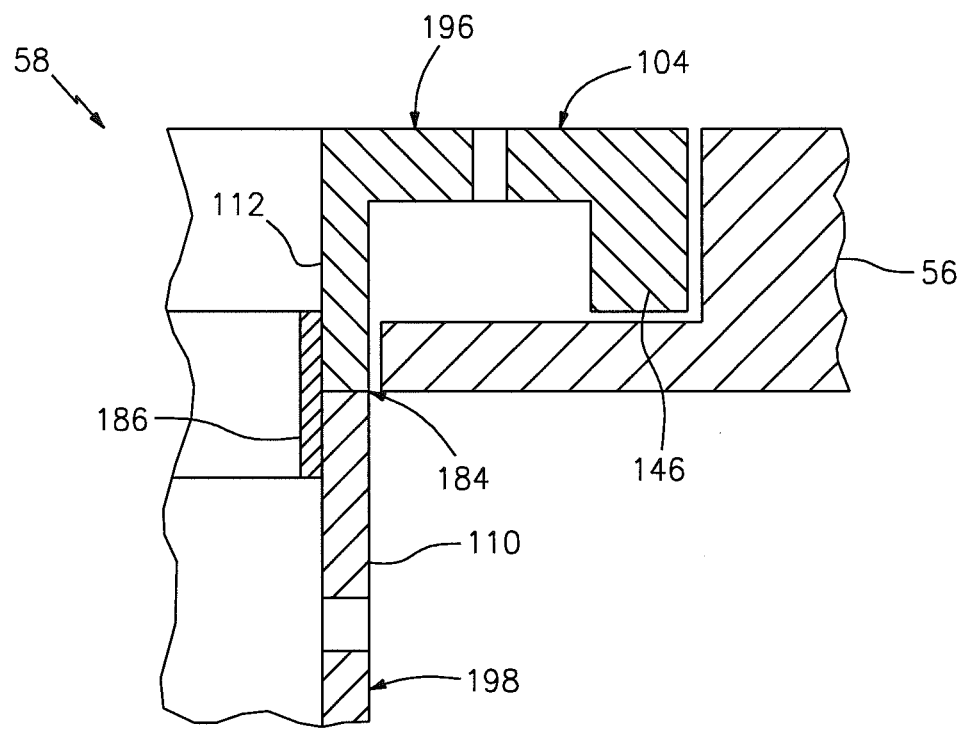
FIG. 13 is another side sectional illustration of a portion of the variable area vane arrangement of FIG. 3 with another adjustable stator vane.

The first vane segment 174 engages (e.g., contacts) the second vane segment 176 at a joint 184. The joint 184 may be configured as a lap joint as illustrated in FIG. 11. Alternatively, the joint 184 may be configured as a scarf joint as illustrated in FIG. 12. Still alternatively, the joint 184 may be configured as a butt joint as illustrated in FIG. 13 or any other type of joint. Referring to FIGS. 10 and 11, the first vane segment 174 is fastened to the second vane segment 176 at the joint 184. The first vane segment 174, for example, is welded, brazed, adhered and/or otherwise bonded to the second vane segment 176 at the joint 184.

FIG. 12 is a side sectional illustration of a portion of the adjustable stator vane 58 with alternate embodiment vane segments 188 and 190. In contrast to the first vane segment 174 of FIG. 10, the first vane segment 188 includes the outer shaft 102 (not shown), the flange 104, the neck 112 and a first portion 192 of the airfoil 110. In contrast to the second vane segment 176 of FIG. 10, the second vane segment 190 includes a second portion 194 of the airfoil 110 and the inner shaft 100 (not shown).

FIG. 13 is a side sectional illustration of a portion of the adjustable stator vane 58 with alternate embodiment vane segments 196 and 198. In contrast to the first vane segment 174 of FIG. 10, the first vane segment 196 includes the outer shaft 102 (not shown), the flange 104 and the neck 112. In contrast to the second vane segment 176 of FIG. 10, the second vane segment 198 includes at least a portion of the airfoil 110. The second vane segment 198 may also include the inner shaft 100 (not shown). An inner sleeve 186 may be welded, brazed, adhered and/or otherwise bonded to the first and/or the second vane segments 196 and 198 at the joint 184 to reinforce the connection between the vane segments 196 and 198. Alternatively, the first vane segment 196 may be indirectly fastened to the second vane segment 198 at the joint 184 through the inner sleeve 186, or another intermediate vane segment (not shown).

Figure 14:
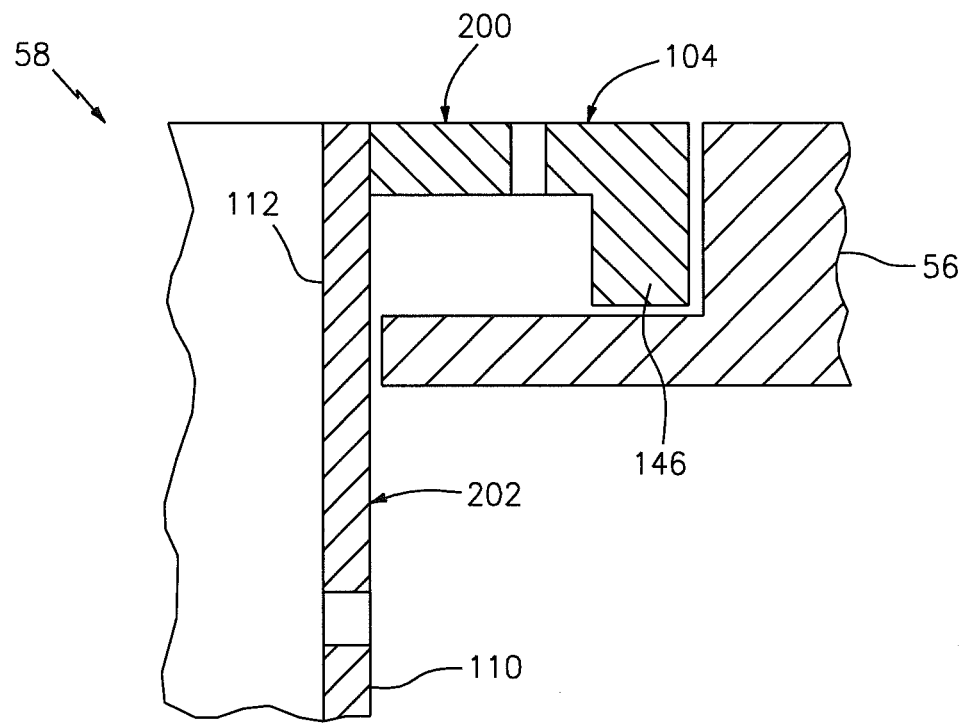
FIG. 14 is another side sectional illustration of a portion of the variable area vane arrangement of FIG. 3 with another adjustable stator vane.

FIG. 14 is a side sectional illustration of a portion of the adjustable stator vane 58 with alternate embodiment vane segments 200 and 202. In contrast to the first vane segment 174 of FIG. 10, the first vane segment 200 includes the flange 104. In contrast to the second vane segment 176 of FIG. 10, the second vane segment 202 includes the airfoil 110, the neck 112, the inner shaft 100 (not shown) and the outer shaft 102 (not shown).

Figure 15:
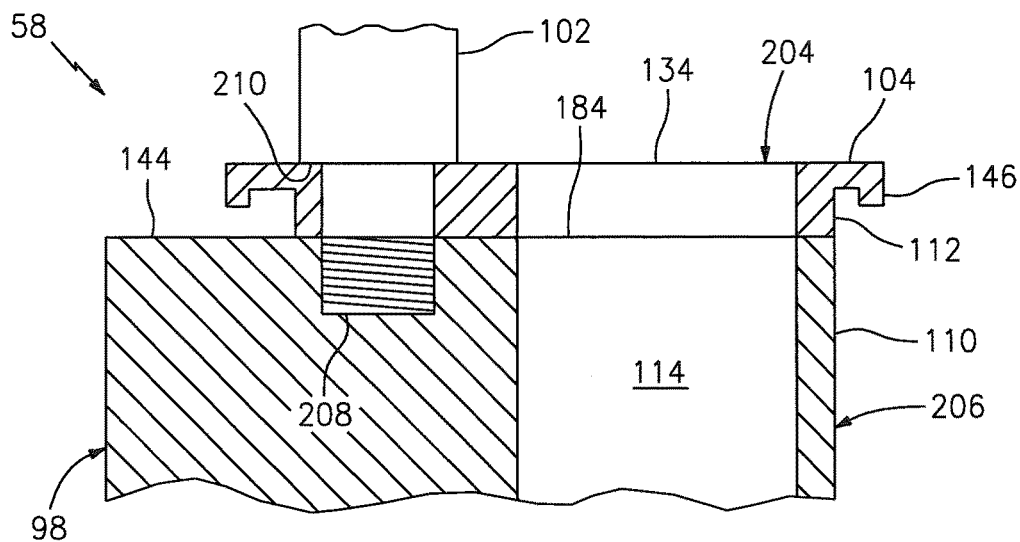
FIG. 15 is another side sectional illustration of a portion of another adjustable stator vane for the variable area vane arrangement of FIG. 3.

FIG. 15 is a side sectional illustration of a portion of the adjustable stator vane 58 with alternate embodiment vane segments 204 and 206. In contrast to the first vane segment 174 of FIG. 10, the first vane segment 204 includes the flange 104 and the neck 112. In contrast to the second vane segment 176 of FIG. 10, the second vane segment 206 includes the airfoil 110 and the inner shaft 100 (not shown). The first vane segment 204 engages the second vane segment 206 at the joint 184. The first vane segment 204 is mechanically fastened to the second vane segment 206 with at least one fastener. The outer shaft 102, for example, includes a threaded portion 208 that mates with (e.g., threads into) the second vane segment 206. A shoulder 210 of the outer shaft 102 clamps the first vane segment 204 against the second vane segment 206. The first vane segment 204 may also or alternatively be mechanically fastened to the second vane segment 206 with one or more fasteners that are discrete from the outer shaft 102.

Figure 16:
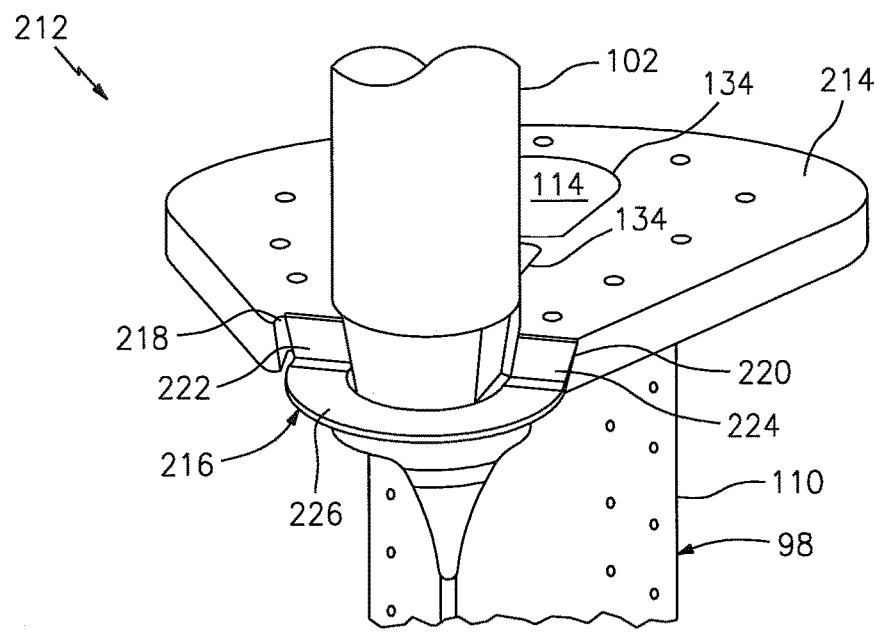
FIG. 16 is a perspective illustration of a portion of another adjustable stator vane.
Figure 17:
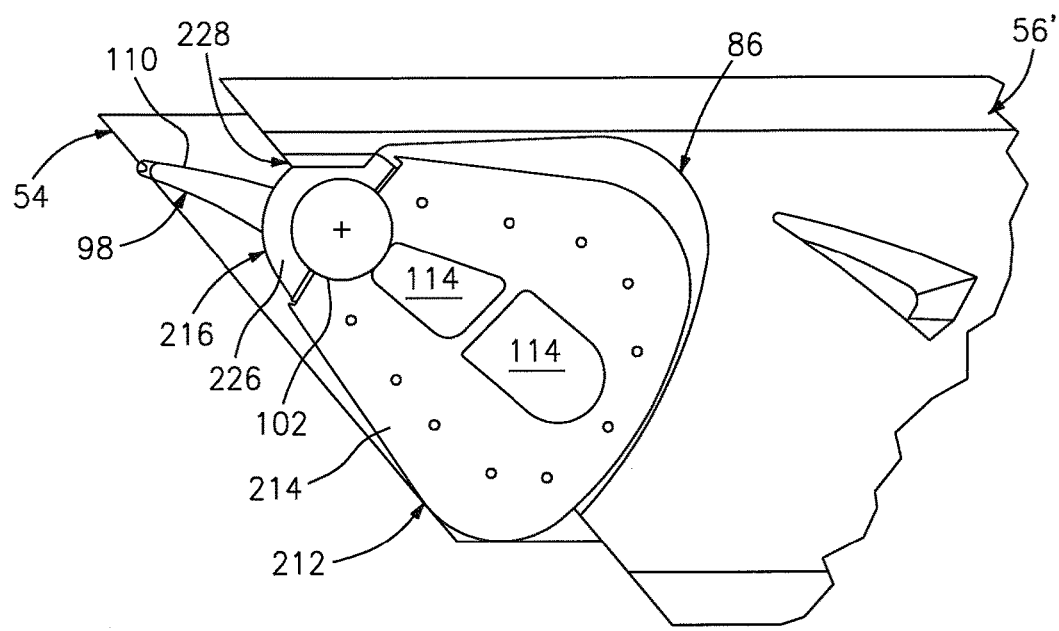
FIG. 17 is a top view illustration of a variable area vane arrangement that includes the adjustable stator vane of FIG. 16.

FIG. 16 is a perspective illustration of another multi-segment adjustable stator vane 212. In contrast to the adjustable stator vane 58 of FIG. 4, the adjustable stator vane 212 includes an alternate embodiment flange 214 and a seal 216 (e.g., a rotatable feather seal). The flange 214 extends circumferentially, partially around one or more of the cavity inlets 134 and/or the outer shaft 102, between a flange first end 218 and a flange second end 220. The first end 218 and the second end 220 are arranged adjacent to and on opposing sides of the outer shaft 102. The seal 216 extends circumferentially, partially around the outer shaft 102, between a seal first end 222 and a seal second end 224. The seal first end 222 is engaged with (e.g., contacts) and forms a seal with the flange first end 218. The seal second end 224 is engaged with and forms a seal with the flange second end 220. Referring to FIG. 17, the seal 216 is mated with the outer platform 56'. A parti-annular body 226 of the seal 216, for example, is inserted into a slot 228 in the outer platform 56', which seals the gap between the outer shaft 102 and the outer platform 56'.

Figure 18:
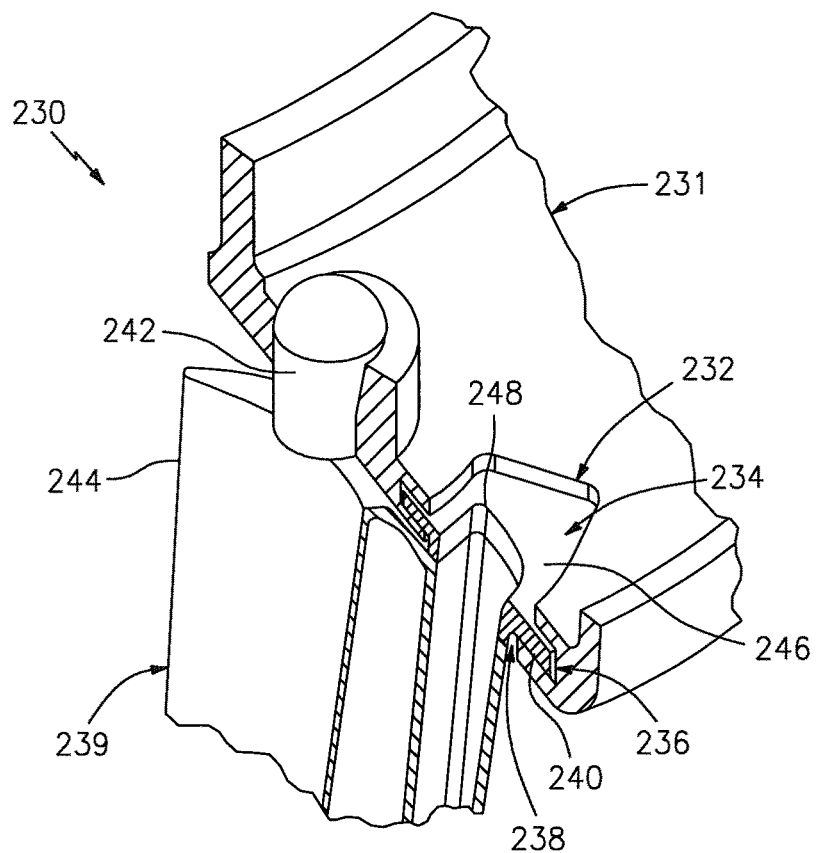
FIG. 18 is a perspective illustration of a portion of another variable area vane arrangement.

FIG. 18 is a perspective cutaway illustration of a portion of another variable area vane arrangement 230. The variable area vane arrangement 230 includes an outer platform 231 with one or more vane apertures 232. In contrast to the vane apertures 86 and 88 of FIG. 6, each vane aperture 232 includes an aperture first portion 234, an aperture second portion 236 and an aperture third portion 238. The second portion 236 defines a slot, between the first and third portions 234 and 238, that receives a flange 240 of another multi-segment adjustable stator vane 239. An outer shaft 242 is connected to an airfoil 244 at (e.g., proximate) a body outer end 246. In addition, the flange 240 extends circumferentially around a cavity inlet 248, but not the outer shaft 242.

The shape, size, number and/or location of one or more of the cavities, cavity inlets, cooling apertures and vane apertures may vary depending upon the size and/or design of the variable area vane arrangement. For example, some or all of the cavities within a respective airfoil may be interconnected; e.g., fluidly coupled. Alternatively, the cavities within a respective airfoil may be fluidly separate. One or more of the cavity inlets and/or the cooling apertures may have elongated (e.g., rectangular, oval, elliptical, etc.) cross-sectional geometries. One or more of the cavity inlets and/or the cooling apertures may alternatively have circular cross-sectional geometries. One or more of the cavity inlets and/or the cooling apertures may have flared geometries. The second vane apertures may be omitted, and the first vane aperture may be located between the first and the second platform ends. The present invention therefore is not limited to any particular cavity and/or cavity inlet or cooling aperture quantities or configurations.

The adjustable stator vanes and the fixed stator vanes may have various configurations other than those described above and illustrated in the drawings. For example, the adjustable stator vane may be configured with a solid airfoil. The neck may be omitted, and the flange may extend radially out from the airfoil. The adjustable stator vane may include more than two vane segments. The fixed stator vane may be configured with a solid airfoil. The present invention therefore is not limited to any particular adjustable stator vane or the fixed stator vane configurations.

The terms "upstream", "downstream", "inner" and "outer" are used to orient the components of the variable area vane arrangements described above relative to the turbine engine 20 and its axis 22. A person of skill in the art will recognize, however, one or more of these components may be utilized in orientations other than those described above. For example, the flange may be connected to the stator vane body at the body inner end, and the inner platform may include the vane apertures. The present invention therefore is not limited to any particular variable area vane arrangement spatial orientations.

The variable area vane arrangements described above may be utilized to direct the flow of air through an engine section other than the LPT section 31B as described above. For example, the variable area vane arrangement 50 may direct the flow of core air into rotor stages of the HPT section 31A, or between the HPT section 31A and the LPT section 31B. Alternatively, the variable area vane arrangement 50 may direct the flow of air into or between adjacent rotor stages of one of the engine sections 28, 29A and 29B, or any other section of the engine 20.

A person of skill in the art will recognize the variable area vane arrangement may be included in various turbine engines other than the one described above. The variable area vane arrangement, for example, may be included in a geared turbine engine where a gear train connects one or more shafts to one or more rotors in a fan section, a compressor section and/or any other engine section. Alternatively, the variable area vane arrangement may be included in a turbine engine configured without a gear train. The variable area vane arrangement may be included in a geared or non-geared turbine engine configured with a single spool, with two spools (e.g., see FIG. 1), or with more than two spools. The variable area vane arrangement may be included in a turbine engine with a single flow path (e.g., stream), with two flow paths (e.g., see FIG. 1), or more that two flow paths. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, comprising:
a plurality of vane segments fastened together to form an adjustable stator vane that pivots about a variable vane axis and includes
a stator vane body extending axially between a first end and a second end, and including an airfoil, a body surface and a cavity, wherein the body surface is located at the first end, and the cavity extends axially from an inlet in the body surface and into the airfoil;
a shaft extending along the variable vane axis from the first end; and
a flange extending circumferentially at least partially around the inlet, and radially from the stator vane body;
wherein a first of the vane segments includes the flange, and a second of the vane segments includes at least a portion of the airfoil;
wherein the stator vane body further includes a neck that extends axially between the body surface and the airfoil;
wherein the flange extends circumferentially around and radially from the neck; and
wherein the flange is axially separated from a surface of the airfoil by a gap.

2. The assembly of claim 1, wherein the flange extends circumferentially around the inlet.

3. The assembly of claim 2, wherein the flange extends circumferentially around the shaft.

4. The assembly of claim 1, wherein the first of the vane segments further includes a portion of the airfoil.

5. The assembly of claim 1, wherein the first of the vane segments further includes the neck.

6. The assembly of claim 1, wherein
the first of the vane segments further includes a first portion of the neck; and
the second of the vane segments further includes a second portion of the neck.

7. The assembly of claim 1, further comprising:
a lip extending circumferentially at least partially around the inlet and the shaft, and axially from a surface of the flange towards the second end;
wherein a channel extends radially between the stator vane body and the lip.

8. The assembly of claim 7, wherein a cooling aperture extends axially through the flange to the channel.

9. The assembly of claim 1, wherein
the airfoil extends longitudinally between a leading edge and a trailing edge;
the airfoil extends laterally between a concave surface and a convex surface; and
the airfoil includes a cooling aperture that extends from the cavity to one of the leading edge, the trailing edge, the concave surface and the convex surface.

10. The assembly of claim 1, wherein the first of the vane segments engages the second of the vane segments at a butt joint.

11. The assembly of claim 1, wherein the first of the vane segments engages the second of the vane segments at a lap joint.

12. The assembly of claim 1, wherein the first of the vane segments engages the second of the vane segments at a scarf joint.

13. The assembly of claim 1, wherein the first of the vane segments is at least one of welded, brazed and adhered to the second of the vane segments.

14. The assembly of claim 1, wherein the first of the vane segments is mechanically fastened to the second of the vane segments with a fastener.

15. An assembly for a turbine engine, comprising:
a plurality of vane segments fastened together to form an adjustable stator vane that pivots about a variable vane axis and includes
a stator vane body extending axially between a first end and a second end, and including an airfoil, a body surface and a cavity, wherein the body surface is located at the first end, and the cavity extends axially from an inlet in the body surface and into the airfoil;
a shaft extending along the variable vane axis from the first end; and
a flange extending circumferentially at least partially around the inlet, and radially from the stator vane body;
a first of the vane segments including the flange;
a second of the vane segments including at least a portion of the airfoil; and
a seal extending circumferentially partially around the shaft between a seal first end and a seal second end;
wherein the flange extends circumferentially partially around the inlet and the shaft between a flange first end and a flange second end; and
wherein the seal first end engages the flange first end, and the seal second end engages the flange second end.

16. An assembly for a turbine engine, comprising:
a plurality of vane segments fastened together to form an adjustable stator vane that pivots about a variable vane axis and includes
a stator vane body extending axially between a first end and a second end, and including an airfoil, a body surface and a cavity, wherein the body surface is located at the first end, and the cavity extends axially from an inlet in the body surface and into the airfoil;
a shaft extending along the variable vane axis from the first end; and a flange extending circumferentially at least partially around the inlet, and radially from the stator vane body;
a first of the vane segments including the flange;
a second of the vane segments including at least a portion of the airfoil;
a vane first platform including a vane aperture; and
a vane second platform;
wherein the shaft comprises a first shaft that is rotatably connected to the first platform;
wherein the adjustable stator vane further includes a second shaft that extends along the variable vane axis from the second end, and is rotatably connected to the second platform; and
wherein the adjustable stator vane extends axially from the second end at least partially into the vane aperture and to the first end, and the airfoil is arranged between first platform and the second platform.

17. The vane arrangement of claim 16, further comprising:
a fixed stator vane connected to the first platform and the second platform;
wherein the second platform is arranged within the first platform.

* * * * *